United States Patent [19]
Attridge et al.

[11] 3,876,599
[45] Apr. 8, 1975

[54] DISPROPORTIONATION OF OLEFINS

[75] Inventors: Charles James Attridge; Arthur Morris; Hugh Thomas, all of Runcorn, England

[73] Assignee: Imperial Chemical Industries Limited, London, England

[22] Filed: Jan. 30, 1974

[21] Appl. No.: 437,874

[30] Foreign Application Priority Data
Mar. 22, 1971 United Kingdom................. 7472/71

[52] U.S. Cl. ............... 260/93.1; 208/134; 252/430; 260/683 D
[51] Int. Cl. .............................................. C08f 1/30
[58] Field of Search .................................... 260/93.1

[56] References Cited
UNITED STATES PATENTS
3,660,369   5/1972   Kormer et al..................... 260/93.1

Primary Examiner—Stanford M. Levin
Attorney, Agent, or Firm—Cushman, Darby & Cushman

[57] ABSTRACT

Process for the disproportionation of olefins by contacting the olefin with a solid initiator which is the product of reacting a defined organometallic complex of molybdenum, tungsten or rhenium with an inorganic matrix having a hydroxylic surface.

12 Claims, No Drawings

DISPROPORTIONATION OF OLEFINS

This is a division of application Ser. No. 236,199 filed Mar. 20, 1972, now U.S. Pat. No. 326,199.

This invention relates to the disproportionation of olefins, and also to transition metal compositions suitable as initiators for use in such a process in which a transition metal complex is chemically bonded to a substantially inert matrix material.

It is known that organometallic compounds can be absorbed on inert inorganic materials and the resultant combination used as a heterogenous catalyst. However, the inorganic material serves merely as a support and does not affect the activity of the resultant catalyst.

We have discovered that certain organometallic complexes may be chemically bonded to inorganic matrices, to produce catalytically active compositions which may be of greater activity than the unmodified organometallic complex.

Our cognate copending British Pat. No. 1,314,828 describes and claims a transition metal composition which is the product of reacting a transition metal complex of the general formula $$R_mMX_p$$

with a substantially inert matrix material having a hydroxylic surface which is free from adsorbed water, wherein M is a transition metal of Groups IVA to VIA of the Periodic Table of the Elements, R is a hydrocarbon group or substituted hydrocarbon group, X is a monovalent ligand, and $m$ and $p$ are integers, $m$ having a value from 2 to the highest valency of the metal M and $p$ having a value from 0 to 2 less than the valency of the metal M, except when M is a metal of Group VIA when p is always 0.

(All references to the Periodic Table are to the version of the Periodic Table of the Elements printed inside the back cover of "Advanced Inorganic Chemistry" by F. A. Cotton and G. Wilkinson, second Edition, (1966), Interscience Publishers, New York, London and Sydney).

According to one aspect of the present invention we now provide a transition metal composition which is the product of reacting a transition metal complex of empirical formula $$R_mM^1X_p \qquad (1)$$

with a substantially inert matrix material having a hydroxylic surface (as hereinafter defined) which is free from adsorbed water, wherein $M^1$ is a metal of Group VIIA of the Periodic Table, R is a hydrocarbon group or substituted hydrocarbon group, X is a monovalent ligand, and $m$ and $p$ are integers, m having a value from 2 upto the highest valence of the metal $M^1$ and $p$ having a value from 0 upto 2 less than the valency of the metal $M^1$.

Many transition metal complexes exist as dimeric or other oligomeric species, and it is to be understood that such species are equally included within formula (1) above.

The transition metal is preferably rhenium; and the monovalent ligand X is preferably an anionic ligand, for example halogen. Hydrocarbon groups of different types may be associated with a single metal atom.

Suitable hydrocarbon groups R include alkyl and a alkenyl groups (including π-alkenyl groups such as π-allyl) and substituted derivatives thereof. A preferred class of organic transition metal complexes are those in which some or all of the groups R are groups of general formula $$-CH_2Y \qquad (2)$$

α-bonded to the transition metal through the carbon atom. In this general formula Y may represent an atom or group capable of interaction with the vacant d-orbitals of the metal $M^1$. Preferably all of the groups R have this formula, but it is possible for some of them to comprise other hydrocarbon groups.

Suitable substituent groups Y include aromatic and polyaromatic groups, for example, phenyl and naphthyl, giving rise, in formula (2) above, to the aralkyl ligands benzyl and (1-methylene-1-naphthyl) and ring substituted derivatives thereof, for example p-methylbenzyl.

Y may also be a cycloalkenyl group, for example, a cyclooctenyl group.

Alternatively, Y may comprise a group of general formula $$Z\,R_3^1 \qquad (3)$$

where Z represents carbon, silicon, germanium, tin or lead, and each $R^1$, which may be the same or different represents a hydrocarbon group or hydrogen; but is preferably an alkyl group. Suitable substituent groups Y thus include neopentyl and trimethylsilylmethyl; $(CH_3)_3CCH_2-$ and $(CH_3)_3SiCH_2-$.

By a "hydroxylic surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silicon or aluminium and oxygen atoms, to the surface of which —Oh groups are attached, the hydrogen atoms of said groups having an acidic function. However, apart from the presence of these —OH groups, silica and alumina are generally regarded as chemically inert. Within the terms silica and alumina we include silica- and alumina-based materials containing small amounts of other suitable inorganic oxides, such as magnesium oxide and zinc oxide.

It is essential that the matrix material is freed from adsorbed water, as this would merely react with and destroy the transition metal complex. The matrix materials may be readily freed from such adsorbed water by, for example, a simple thermal treatment.

The reaction between the transition metal complex and matrix material comprises displacement of one or more of the hydrocarbon groups by the hydrogen atom of an —OH group or groups, with liberation of the corresponding free hydrocarbon. The reaction may be represented by the following equation:

Matrix $(-OH)_n + {}_{M^1}R_mX_p \rightarrow$ Matrix $(-O)_nM^1 R_{m-n}X_p + n\ RH$     (4)

wherein $M^1$, R, X, $m$ and $p$ have the meanings previously ascribed to them and $n$ is an integer being not more than $(m-1)$. It has been found that when the defined components of our transition metal compositions are reacted, all except one of the hydrocarbon groups of the organometallic compound may be displaced by —OH groups of the matrix, so that there is always at least one hydrocarbon group attached to the transition metal in the product. This appears to be independent of the number of reactable hydroxylic groups present on the surface of the matrix.

The term Matrix $(-OH)_n$ represents an inert matrix having at least $n$ reactable hydroxylic groups attached to its surface. The number of reactable hydroxylic groups, that is, the number available for reaction, will depend on the nature and condition of the matrix material. For example, in some materials, because of their molecular configuration, some of the hydroxylic groups present are not reactive under our conditions. Thus, it is usual to characterise a sample of the matrix material before use, for example, by reaction with an excess of the transition metal complex or as described below.

The progress of the reaction in the manner indicated in equation (4) above may be readily followed by the evolution of free hydrocarbon RH or by colour changes in the reactants. The fact that the product is a chemical entity, not a physical mixture such as a transition metal complex physically adsorbed on a granular matrix, may be demonstrated by removing the product, a coloured, insoluble composition, from the reactants and washing it with a solvent which would remove any adsorbed complex from the matrix. When this is done, the complex remains on the matrix. Contrary to this, when our complexes are mixed with an inert matrix containing no reactable hydroxylic groups, for example silica which has been calcined at 1200°C, although the complex is adsorbed on the matrix, it is readily removed by washing the product with a solvent.

As previously mentioned, the number of reactable hydroxylic groups present in a given weight of matrix will depend upon its nature (for example, whether it is silica or alumina) and its condition (for example, its surface area and the treatment it has received to remove adsorbed water). Thus the precise composition of transition metal compositions according to our invention may vary from one batch or sample to another of the same matrix material; but successive portions of the same material prepared under identical conditions will give products having the same composition.

Compositions according to the present invention may be prepared by contacting a solution of the transition metal complex with a suitable matrix material, in the absence of free or adsorbed water. The solvent used for the complex should be dry and inert; hydrocarbon solvents are preferred. Since many of the transition metal complexes which may be used in our process are thermally unstable, the reaction temperature must be maintained low enough to avoid decomposition of the complex. With some complexes, temperatures below 0°C are required. Depending on the air-sensitivity of the transition metal complex it may also be necessary to operate in oxygen-free conditions, for example, under a nitrogen blanket.

The ratio of transition metal complex to matrix material may be varied within wide limits depending upon the physical and chemical nature of the components used; but it is preferred that the proportions and the nature of the reacting materials, for example, the values of $m$ and $p$, are so chosen that at least two and preferably at least three hydrocarbon groups remain attached to the transition metal atom in the product composition. Preferably, substantially all the hydroxylic groups of the matrix material are reacted with the transition metal complex.

The matrix material may be characterised in a number of ways. A first method comprises suspending the matrix material, which has previously been freed from water, in an inert liquid, and titrating the reactable hydroxylic groups with a solution of the transition metal complex in an inert solvent. Since most transition metal complexes are strongly coloured, the end-point is readily detectable by the presence of a permanent colouration in the suspending solvent. In compositions prepared in this way, all the reactable hydroxylic groups of the matrix are reacted with the metal complex. The compositions produced may then be recovered by filtration from the reaction medium, freed from solvent and stored dry or under solvent in oxygen-free conditions.

It is possible, if desired, to add less than the complete titre of transition metal complex, or even to add excess transition metal complex, but when excess complex is used, it will remain in the reaction medium when the composition is separated.

A second method for preparing compositions according to our invention comprises, first, characterising a sample of the material by adding excess of an organometallic transition metal complex (which may or may not have the formula (1) above) or a Grignard reagent (magnesium hydrocarbyl halide) to a sample of the matrix material and determining the number of molecules of hydrocarbon liberated from a known amount of matrix material; and secondly, adding to a further portion of the matrix material just sufficient of the desired transition metal complex to liberate an appropriate amount of hydrocarbon. For example, a sample of the matrix material may be suspended in a solvent and excess of a transition metal $\pi$-allylic compound added. The volume of propylene produced is measured and related to the weight of matrix material. A second sample of the matrix material is then taken and the appropriate transition metal $\pi$-allylic complex added until the volume of propylene produced per gram of matrix material present is equivalent to that previously determined by addition of excess transition metal complex.

As already mentioned, the compositions may be separated from the media in which they are produced and exist as chemical entities of definite composition. In many cases they are more thermally stable than the transition metal complexes from which they are produced.

Compositions prepared as described above may have useful catalytic activity. For example, rhenium-containing compositions may be used as reforming catalysts for petroleum hydrocarbon.

According to another aspect of the present invention, we provide a process for the disproportionation of olefinically unsaturated hydrocarbons in which the olefinically unsaturated hydrocarbon is contacted with an initiator which is the product of reacting a transition metal complex of empirical formula $$R_mMX_p \qquad (5)$$

with a substantially inert matrix material having a hydroxylic surface which is free from adsorbed water, as described above or in the Complete Specification of our cognate copending British Patent Application No. 40416/69 and 40417/69, wherein M is molybdenum, tungsten or rhenium, R is a hydrocarbon group or a substituted hydrocarbon group, X is a monovalent ligand and $m$ and $p$ are integers, $m$ having a value from 2 upto the highest valence of the metal M and $p$ having a value from 0 upto 2 less than the valence of the metal M.

As described above, the monovalent ligand X is preferably an anionic ligand, for example halogen, and the groups R may be the same or different.

Suitable hydrocarbon groups R include alkyl and alkenyl groups (including $\pi$-alkenyl groups such as $\pi$-allyl) and substituted derivatives thereof. A preferred class of organic transition metal complexes are those in which some or all of the groups R are groups of general formula $$-CH_2Y \qquad (2)$$

$\sigma$-bonded to the transition metal through the carbon atom. In this general formula Y may represent an atom or group capable of interaction with the vacant D-orbitals of the metal M. Preferably all of the groups R have this formula, but it is possible for some of them to comprise other hydrocarbon groups.

Suitable substituent groups Y include aromatic and polyaromatic groups, for example, phenyl and naphthyl, giving rise, in formula (2) above, to the aralkyl ligands benzyl and (1-methylene-1-naphthyl) and ring substituted derivatives thereof, for example p-methylbenzyl. Y may also be a cycloalkenyl group, for example, a cyclooctenyl group.

Alternatively, Y may comprise a group of general formula $$Z\ R_3^1 \qquad (3)$$

where Z represents carbon, silicon, germanium, tin or lead, and each $R^1$, which may be the same or different, represents a hydrocarbon group or hydrogen; but is preferably an alkyl group. Suitable substituent groups Y thus include neopentyl and trimethylsilylmethyl; $(CH_3)_3CCH_2-$ and $(CH_3)_3SiCH_2-$.

Suitable transition metal complexes of formula (5) above thus include tetrakis ($\pi$-allyl) tungsten or molybdenum, tetrakis-($\pi$-allyl)dimolybdenum, hexakis($\pi$-allyl dirhenium, tris($\pi$-allyl)-tungsten or molybdenum halides, the $\pi$-methallyl (2-methylallyl), and $\pi$-crotyl(3-methylallyl) homologues of the above complexes, molybdenum and tungsten tetra(benzyl, tris(benzyl) tungsten or molybdenum halides, tetrakis(p-methylbenzyl) tungsten or molybdenum, tetrakis(1-methylene-1-naphthyl) tungsten or molybdenum, tetrakis-(trimethylsilymethyl) tungsten or molybdenum, and hexakis(trimethylsilylmethyl)dimolybdenum.

Particularly when molybdenum and rhenium complexes of formula (5) above are employed in the production of the initiator, it is preferred that the transition metal complex is an oligomeric, for example dimeric species, as in tetrakis($\pi$-allyl)dimolybdenum or hexakis($\pi$-allyl)dirhenium.

It is also preferred that the values of $m$ and $p$ are such that at least three groups R remain attached to the metal atom M in the initiator composition.

Conveniently, the initiator is employed in a finely divided form, e.g. particles, granules, pellets or the like.

Since the transition metal complexes are often air- or water-sensitive, it is preferred to operate under anhydrous and oxygen-free conditions, for example by drying all solvents used in the preparation of the initiator or in the disproportionation reaction and by operating under an oxygen-free atmosphere. For example nitrogen or the reactant gases.

By "disproportionation" is meant a reaction between two olefinically unsaturated molecules with cleavage of the double bonds and recombination of the resultant fragments to form different olefinically unsaturated materials.

Such a reaction commonly gives more than one product, but in all cases the sum of the number of carbon atoms of the products equals the sum of the number of carbon atoms of the reactants.

Disproportionation may occur between two molecules of the same material, when two products are normally produced, one of higher molecular weight than the starting material and one of lower molecular weight. For example, butene can give a mixture of $C_2-C_6$ olefins and hexene a mixture of $C_2-C_{10}$ olefins. Alternatively, molecules of two different materials may react, as for example, in the reaction of but-1-ene and pent-2-ene to give propylene and hex-3-ene.

The term "olefinically unsaturated hydrocarbon" is intended to include both mono-olefins, for example ethylene, propylene, butenes, pentenes and hexenes, and polyenes, for example butadiene.

Alternatively, cyclic olefins, for example cyclopentene or norbornene (bicyclo[2.2.1]hept-2-ene) may be employed as starting material. Disproportionation in such a case involves ring opening at the olefinic double bond and recombination of the resultant fragments. This process may occur repetitively to produce polymeric materials; for example disproportionation of cyclopentene produces a linear, rubbery polypentenamer.

The reaction is carried out by contacting the olefinically unsaturated hydrocarbon with the initiator.

The starting materials may be liquid or gaseous under the conditions of reaction. The starting materials may be dissolved in a suitable inert solvent or diluent, for example a paraffinic hydrocarbon, but it is preferred to operate in the absence of solvent.

The reaction may be carried out as a batch process in a suitable vessel, preferably with agitation of the contents to ensure intimate contact of the reactants and the initiator.

Alternatively, the reactants may be caused to flow past the initiator. The reactants may be caused to percolate through a fixed bed of initiator, or the initiator particles may be suspended in a moving stream of the reactants. Preferably, the initiator particles are caused to flow in countercurrent fashion to the moving stream of reactants.

Alternatively, the initiator may be employed as a fluidised bed. Preferably, a gaseous reactant is used to induce fluidisation of the initiator particles.

Temperature and pressure of reaction are not critical. It is preferred to operate at ambient pressure, but particularly with gaseous reactants, higher pressures may be employed. The temperature of reaction will depend of the desired reaction rate, but it is to be noted that higher temperatures commonly favour the production of products of higher carbon number. It will be appreciated that isomerisation of starting material or initial products may occur as determined by the thermodynamics of the system, and this tendency may be increased by increased contact times over the catalyst.

On completion of reaction, materials may be separated from the catalyst by conventional means, for example decantation or filtration. If desired, individual reaction products may be separated from each other or from unreacted starting materials, for example by distillation.

Particularly when the initiator is employed in a liquid suspension, it may be desirable to increase the surface area of the initiator composition by subjecting it to a comminution procedure, for example by subjecting a suspension of the initiator to ultrasonic dispersion.

The invention is now illustrated by the following Examples. In all the Examples, transition metal complexes and compositions containing them were prepared and handled under an atmosphere of dry, oxygen-free nitrogen or, where appropriate, were blanketed with the olefin undergoing reaction. All solvents and diluents were dried by distillation from sodium wire, and were deoxygenated before use. The products of disproportionation reactions were analyzed by gas-liquid chromatography.

PREPARATION OF TRANSITION METAL COMPLEXES

Example 1 - Preparation of Molybdenumallyl

Molybdenum pentachloride was dissolved in diethyl ether, and 5 equivalents of an etheral solution of allyl-magnesium chloride were added dropwise at ambient temperature, while the mixture was stirred vigorously.

On completion of reaction, the deep green solution was filtered to remove magnesium chloride, and the ether was stripped off in vacuo. The residue was extracted with the minimum quantity of dry, deoxygenated pentane to give a deep green solution which was shown by infra-red spectroscopy to contain tetrakis($\pi$-allyl) molybdenum and the dimeric species tetrakis($\pi$-allyl)dimolybdenum. For reasons of convenience, this mixture will be referred to as "molybdenum allyl".

The tetrakis($\pi$-allyl) molybdenum could be purified, if required, by fractional crystallisation.

Example 2- Preparation of Tetrakis($\pi$-allyl) Molybdenum

An etheral solution of molybdenum pentachloride was added dropwise over a period of 3 hours to a stirred solution of allyl magnesium chloride in tetrahydrofuran at 60°C until the molar ratio of molybdenum pentachloride to Grignard reagent was 0.18;1. The mixture was evaporated to dryness in vacuo and the residue was extracted with pentane at ambient temperature to give a yellow solution. This solution was concentrated, and held at −40°C overnight when yellow crystals of tetrakis($\pi$-allyl)molybdenum separated out. These were purified by sublimation at 60°–65°C and 1 torr pressure, and identified by infra-red spectroscopy.

Example 3 - Preparation of Tetrakis($\pi$-allyl)dimolybdenum

Tetrakis($\pi$-allyl)dimolybdenum (molybdenum $\pi$-allyl dimer) was prepared according to the method described and claimed in our copending British Patent Application No. 30266/71.

dimolybdenum tetra-acetate was suspended in dry, degassed, diethyl ether in the proportion of 200 mole per litre. The suspension was blanketed with nitrogen and 900 mole of allyl magnesium chloride were added per litre of suspension, as a 0.45 M solution in diethyl ether. The mixture was stirred at ambient temperature for about 1.5–2.5 hours until all the solid material had dissolved and the solution was a dark green colour.

The solution was evaporated to dryness and the resultant green residue was extracted four times with pentane to give a pale green solution of tetrakis($\pi$-allyl)dimolybdenum, which was identified by infra-red spectroscopy.

Example 4 - Preparation of Tetrakis($\pi$-crotyl) dimolybdenum

Tetrakis($\pi$-crotyl) dimolybdenum was prepared by the method described and claimed in our copending British Patent Application No. 30266/71.

Dimolybdenum tetra-acetate was suspended in dry, deoxygenated diethyl ether in the proportion of 311 mole per litre.

The suspension was added dropwise over a period of 1 hour to a stirred etheral solution of crotyl magnesium bromide at 0°C, until the molar ratio of dimolybdenum tetra-acetate to Grignard reagent was 1:5.36.

Stirring was continued until all the dimolybdenum tetra-acetate had dissolved, and the resultant green solution was evaporated to dryness. the residue was extracted with dry, deoxygenated pentane at −40°C to give a dark green solution which is believed to be tetrakis($\pi$-crotyl)dimolybdenum.

Example 5 - Preparation of Tetrakis($\pi$-allyl) tungsten

Solid tungsten hexachloride was added over a period of 2 hours to a stirred solution of lithium allyl in diethyl ether/tetrahydrofuran at ambient temperature, until the molar ratio of tungsten hexachloride to lithium allyl was 1:8. The resultant brown mixture was stirred for another hour and the solvents were removed in vacuo at ambient temperature.

The brown residue was extracted with pentane at −40°C to give a pale brown solution from which pale brown crystals of tetrakis($\pi$-allyl)tungsten could be recovered. These were purified by sublimation at 70°–75°C and a pressure of 1 torr, and identified by infra-red spectroscopy.

Example 6 - Preparation of rhenium $\pi$-allyl

Anhydrous rhenium pentachloride was dissolved in pure, anhydrous diethyl ether to give an orange-red solution.

The solution was cooled to −70°C and 5 equivalents of an etheral solution of allylmagnesium chloride were added while the reaction mixture was stirred.

After complete addition of the allylmagnesium chloride, the mixture was warmed to −40°C and allowed to stand for 12 hours. A green solution was obtained.

The ether was evaporated off under vacuum at −40°C, and the solid residue was extracted with dry pentane to give a green solution of a rhenium allyl species. This solution was stored in the absence of moisture at −78°C.

Example 7 - Preparation of bis(allyl)rhenium chloride

An ethereal suspension of rhenium pentachloride was added dropwise over a period of 2 hours to a stirred solution of lithium allyl in tetrahydrofuran at 60°C until the molar ratio of rhenium pentachloride to lithium allyl was 1:7. The brown mixture was stirred for another hour and the solvents were removed in vacuo.

The brown residue was extracted with pentane to yield a brown solution. This was evaporated to dryness, and the resultant solid product sublimed at 75°C and a pressure of 0.1 torr to give a yellow oil.

A mass spectrum of this oil gave a parent ion at m/e = 302, with a Re, Cl isotope pattern indicative of bis(allyl)rhenium chloride.

Example 8 - Preparation of hexakis($\pi$-allyl)dirhenium

Hexakis($\pi$-allyl)dirhenium (rhenium $\pi$-allyl dimer) was prepared according to the method described and claimed in our copending British Patent Application No. 30266/71.

Dichloro-dirheniumtetra-acetate was suspended in dry diethyl ether in the porportion of 50 mole per litre. The reaction vessel was purged with nitrogen, and 350 mole of allyl magnesium chloride per litre of suspension were added slowly, as a 0.14 M solution in diethyl ether. The contents of the reaction vessel were stirred during addition of the allyl magnesium chloride. The yellow-orange suspension was immediately converted to a deep red-brown solution.

After 1 hour at ambient temperature, the reaction mixture was evaporated to dryness while holding the temperature below 0°C. The solid residue was extracted three times with dry, deoxygenated pentane, at a temperature below 0°C, to give a deep red-brown solution of hexakis($\pi$-allyl)dirhenium, which was identified by infra-red spectroscopy and mass spectral analysis. This solution was stored under nitrogen at a temperature below −40°C.

Preparation of Initiator Compositions

In the following Examples, the appropriate matrix material was dried in vacuo ($10^{-5}$ torr) as described in the Examples and was then cooled under dry nitrogen. The dry material was suspended in the minimum quantity of dry, deoxygenated pentane and the suspension titrated with a pentane solution of the appropriate transition metal complex, prepared as in Examples 1–8, until a permanent colouration remained in the suspending solvent. The coated composition was recovered by filtration, washed with pentane and dried in vacuo.

Alternatively, the initiator could be employed as a suspension in pentane.

Example 9 - "Molybdenum allyl"/alumina with but-1-ene

60–80 mesh BSS $\gamma$-alumina (Koninklijke Zwavelzuurfabrieken v/h Ketjen N. V. Grade CK 300 ) was dried at 500°C for 12 hours and reacted with "molybdenum allyl".

The product, which was coloured brown and contained 1.3% by weight of molybdenum, was placed in a dry flow reactor in an atmosphere of dry, oxygen-free nitrogen. But-1-ene, which had been deoxygenated and dried by passing it over freshly prepared, support copper turnings (BTS Catalyst) and molecular sieve (type 5A) was passed through the catalyst bed at 25°C for 12 hours, at a velocity calculated to give a contact time of 12 seconds.

The effluent gas contained $C_2$–$C_3$ olefins, the average butene conversion being 2%.

Conversion could be temporarily increased to 6% by increasing the reactor temperature to 80°C.

Progressive increases in reactor temperature temporarily increased catalyst activity, and also altered the product distribution towards the higher carbon numbers.

At 200°C, product olefins ranged from $C_2$ to $C_{12}$ and, also, substantial isomerisation to but-2-ene was occurring.

Example 10 - "Molybdenum allyl"/silica with hex-1-ene

Silica (Manosil Grade VN3) was dried at 500°C for 12 hours and reacted with "molybdenum allyl".

The coated silica, which contained 0.077% by weight of molybdenum, was packed in a column, and 15 times its weight of hex-1-ene vapour, at reflux temperature, was passed through the column over a period of 4 hours.

apart from butene, the effluent contained decene (46%), nonene (12%), octene (2%), heptene (13%), and unreacted hex-1-ene (27%).

Example 11 - "Molybdenum allyl"/alumina with norbornene $\gamma$-Alumina (Grade CK 300) was dried at 500°C for 24 hours and was reacted with "molybdenum allyl". The product contained 0.32% by weight of molybdenum.

The initiator was mixed with five times its weight of norbornene and the mixture was heated to 100°C for 2 hours.

The initiator was removed by filtration, and methanol added to the filtrate to precipitate a rubbery polymer.

Evaporation of the solvents after precipitation of the polymer left a sweet-smelling yellow oil, which was shown by analysis to be a mixture of oligomers of norbornene.

Example 12 - Tetrakis($\pi$-allyl)molybdenum/silica gel with hex-1-ene

Silica gel (Davison Chemical Co. Grade 952) was dried at 650°C for 12 hours and was reacted with tetrakis($\pi$-allyl)molybdenum. The product was yellow-brown, and contained 1.1% by weight of molybdenum.

Hex-1-ene was added to the initiator, in the proportion of 20 dm$^3$ per kg, and the mixture was stirred at ambient temperature for 20 hours.

At the end of this time, 67% of the hexene had reacted; 35% to decene and ethylene, 18% to heptene and pentene, 11% to nonene and propylene, and 3% to octene and butene.

Example 13 - Tetrakis($\pi$-allyl)molybdenum/silica gel with hex-1-ene

The procedure of Example 12 was repeated, except the silica gel was dried at 200°C for 12 hours. The coated silica gel was brown and contained 1.5% by weight of molybdenum.

After 1 hour reaction at 60°C, 20% of the hexene had been converted almost exclusively to decene and ethylene.

Example 14 - Molybdenum π-allyl dimer/alumina with hex-1-ene

γ-Alumina (Grade CK 300) was dried at 500°C for 12 hours and reacted with molybdenum π-allyl dimer. The product, which was coloured black and contained 2.4% by weight of molybdenum, was placed in a round-bottomed flask, together with 5 times its own weight of hex-1-ene. Ethylene was evolved on contact of the hexene with the catalyst compositon at ambient temperature.

The flask contents were heated to 35°C for 4 hours. At the end of this period, analysis of the flask contents showed that 25% of the hexene had been converted to ethylene and decene.

Example 15 - Molybdenum π-allyl dimer/alumina with hex-1-ene

The procedure of Example 14 was repeated at a temperature 35°C for 24 hours followed by a period of 4 hours at reflux temperature.

The conversion of hex-1-ene to ethylene and decene was 75%. In addition, about 10% of the product olefins were derived from isomers of hex-1-ene.

Example 16 - Molbydenum π-allyl dimer/alumina with hex-1-ene

γ-Alumina pellets (Grade CK 300) were dried at 500°C and reacted with molybdenum π-allyl dimer. The alumina turned dark brown. The coated alumina was mixed at ambient temperature with dry, degassed hex-1-ene (7.5 dm³ of hexene per kg. of alumina).

After 4 hours at ambient temperature, 76% of the hexene was converted to ethylene and dec-5-ene. The mixture was warmed to 80°C when further reaction occurred. The liquid became viscous and gas-liquid chromatography showed the presence of $C_7$—$C_{20}$ hydrocarbons.

Example 17 - Molybdenum π-allyl dimer/silica gel with hex-1-ene

Silica gel (Grade 952) was dried at 650°C for 12 hours and reacted with tetrakis(π-allyl)dimolybdenum. The product was a very dark green black and contained 3 % by weight of molybdenum.

Hex-1-ene was added to the initiator, in the proportion of 20 dm³ per kg, and the mixture was stirred at 60°C for 4 hours.

20% of the hexene was converted almost exclusively to decene and ethylene.

Example 18 - Molybdenum π-allyl dimer/silica gel with hex-1-ene

The procedure of Example 17 was repeated, except that the silica gel was dried at 200°C. The coated silica gel was deep maroon and contained 3.5% by weight of molybdenum.

After 15 hours reaction at 60°C, 35% of the hexene was converted almost exclusively into decene and ethylene.

Example 19 - Molybdenum π-allyl dimer/alumina with hept-3-ene

γ-Alumina was dried at 500°C and reacted with molybdenum π-allyl dimer. The product was dark-black and contained 2.3% by weight of molybdenum.

Hept-3-ene was added to the initiator, in the proportion of 10 dm³ per kg, and the mixture was allowed to stand at ambient temperature for 18 hours.

14% of the heptene reacted; 10% to decenes and butenes, 3% to octenes and hexenes, and 1% to nonenes and pentenes.

Example 20 - Molybdenum π-allyl dimer/alumina with 3,3-dimethylbutene-1

γ-Alumina was dried at 500°C and reacted with molybdenum π-allyl dimer. The product was dark brown-black and contained 2.3% by weight of molybdenum.

3,3-Dimethylbutene-1 was added to the initiator, in the proportion of 10 dm³ per kg, and the mixture was allowed to stand at ambient temperature for 24 hours.

16% of the dimethylbutene was converted to a mixture of $C_{8-10}$ olefins.

Example 21 - Molybdenum π-allyl dimer/alumina with cyclopentene

π-Alumina (Grade CK 300) was dried at 500°C for 24 hours and was coated with molybdenum π-allyl dimer. The product contained 2.4% by weight of molybdenum.

The initiator was charged to a stainless steel autoclave, together with cyclopentene, in a weight ratio of 4.6:35. The mixture was stirred at ambient temperature and autogenous pressure for 5 hours and was then allowed to stand for 2 days.

The resultant clear, viscous liquid was washed from the initiator with benzene and was evaporated to dryness to yield a rubber-like polymer. This was shown by infra-red spectroscopy to be a polypentenamer —(CH$_2$CH$_2$CH$_2$—CH=CH)—$_n$, with cis and trans forms in the ratio of 47:53.

The conversion of cyclopentene to polymer was 12%.

Example 22 - Tetrakis(π-crotyl)dimolybdenum/alumina with hex-1-ene

γ-Alumina pellets were dried at 500°C and reacted with tetrakis (π-crotyl)dimolybdenum. The product was a dark chocolate-brown and contained 1.3% by weight of molybdenum.

The initiator was mixed with hex-1-ene (10 dm³ of hexene/3 kg of alumina) and the mixture was stirred at 20°C for 2 hours. At this end of this period 6.5% of the hexene had reacted; 4.2% to decenes and ethylene, 1.3% to nonenes and propylene, and the remainder to octenes, heptenes, pentenes and butenes.

Example 23 - Tetrakis(π-allyl)tungsten/alumina with hex-1-ene

γ-Alumina (Grade CK 300) was dried at 500°C for 12 hours and reacted with tetrakis(π-allyl) tungsten. The product contained 0.8% by weight of tungsten.

The initiator was placed in a round-bottomed flask, together with hex-1-ene, in a weight ratio of 3:10. Evolution of ethylene occurred on contact of the hexene with the catalyst composition at ambient temperature.

The flask contents were heated to 35°C for 8 hours. At the end of this period, the conversion of hex-1-ene to ethylene and decene was 25%.

Example 24 - Tetrakis(π-allyl)tungsten/alumina with hex-1-ene

The procedure of Example 23 was repeatd at a temperature of 35°C for 24 hours, followed by a period of 6 hours at reflux temperature.

Conversion of hex-1-ene to ethylene and decene was 70%. In addition, about 5% of the product olefins were derived from isomers of hex-1-ene.

Example 25 - Rhenium π-allyl/alumina with hex-1-ene

γ-Alumina (Grade CK 300) was dried at 500°C for 1 hour and reacted with rhenium π-allyl. The product was a pale brown.

Hex-1-ene was refluxed with the initiator for several hours to give dec-5-ene.

Example 26 - Bis(allyl)rhenium chloride/alumina with hex-1-ene

γ-Alumina was dried at 500°C and reacted with bis-(allyl) rhenium chloride. The product was pale brown and contained 5% by weight of rhenium.

Hex-1-ene was added to the initiator at ambient temperature, in the proportion of 4 dm³ per kg. A vigorous evolution of ethylene occurred immediately.

After 2 hours reaction at ambient temperature, 57% of the hexene was converted almost exclusively to decene and ethylene.

Example 27 - Bis(allyl)rhenium chloride/alumina with cyclopentene

γ-Alumina was dried at 500°C and was reacted with bis(allyl) rhenium chloride. The product was pale brown and contained 5% by weight of rhenium.

A solution of cyclopentene in toluene (5.66M) was stirred with the initiator for 24 hours at embient temperature, in the proportion of 10 dm³ per kg.

5% of the cyclopentene was converted to yellow elastomeric material.

Example 28 - Rhenium π-allyl dimer/alumina with hex-1-ene

γ-Alumina was dried at 500°C for 3 hours and was reacted with rhenium π-allyl dimer. The product was brown.

The initiator was mixed at ambient temperature with dry degassed hex-1-ene (4 dm³ of hexene per kg of alumina). Immediate evolution of ethylene occurred.

After 2 hours reaction, 14% of the hexene was converted to dec-5-ene.

What we claim is:

1. A process for the disproportionation of olefinically unsaturated cyclic hydrocarbons in which the olefinically unsaturated cyclic hydrocarbon is contacted with an initiator which is the product of reacting under anhydrous and oxygen-free conditions a transition metal complex of empirical formula $$R_mMX_p$$

with a substantially inert inorganic oxide matrix material having a hydroxylic surface which is free from adsorbed water and which is capable of reacting with the transition metal complex, wherein M is molybdenum, tungsten or rhenium, R is a hydrocarbon group or a substituted hydrocarbon group, X is a monovalent ligand and $m$ and $p$ are integers, $m$ having a value of from 2 up to the highest valence of the metal M and $p$ having a value from 0 up to 2 less than the valence of the metal M.

2. A process as claimed in claim 1 in which the groups R, which may be the same or different, are each alkyl or alkenyl or groups of general formula —CH₂Y α-bonded to the transition metal through the carbon atom, where Y is an atom or group capable of interaction with the vacant d-orbitals of the metal M or is a group of general formula $ZR_3^1$, where Z is carbon, silicon, germanium, tin or lead and each $R^1$, which may be the same or different, is a hydrocarbon group or hydrogen.

3. A process as claimed in claim 1 in which the groups R are π-allyl, benzyl, p-methylbenzyl, 1-methylene-1-naphthyl, neopentyl or trimethylsilylmethyl.

4. A process as claimed in claim 2 in which the transition metal complex is tetrakis(All) tungsten or molybdenum, tetrakis(All) dimolybdenum, hexakis(All) dirhenium, tris(All) tungsten halide, or tris(All) molybdenum halide, where (All) is π-allyl, π-methallyl, or π-crotyl, molybdenum or tungsten tetrabenzyl, tris(-benzyl) tungsten halide, tris benzyl molybdenum halide, tetrakis(p-methylbenzyl) molybdenum or tungsten, tetrakis-(1-methylene-1-naphthyl) molybdenum or tungsten, tetrakis(trimethylsilylmethyl) molybdenum or tungsten, or hexakis(trimethylsilylmethyl) dimolybdenum.

5. A process as claimed in claim 1 in which the values of $m$ and $p$ are such that at least three groups R remain attached to the metal atom M in the initiator composition.

6. A process as claimed in claim 1 in which the transition metal complex is an oligomeric (including dimeric) species.

7. A process as claimed in claim 1 in which the matrix material is silica or alumina.

8. A process as claimed in claim 1 in which substantially all the reactable hydroxylic groups of the matrix have been reacted with the transition metal complex.

9. A process as claimed in claim 1 when performed in the absence of solvent for the olefinically unsaturated hydrocarbon.

10. A process as claimed in claim 1 in which the olefinically unsaturated hydrocarbon is caused to flow past the initiator.

11. A process as claimed in claim 1 in which, before use, a suspension of the initiator is subjected to an ultrasonic dispersion procedure.

12. A process as claimed in claim 1 in which the olefinically unsaturated cyclic hydrocarbon is norbornene or cyclopentene.

* * * * *